US006624825B1

United States Patent
Fujiyoshi

(10) Patent No.: US 6,624,825 B1
(45) Date of Patent: Sep. 23, 2003

(54) PIXEL RESOLUTION CONVERTING CIRCUIT AND IMAGE DISPLAY DEVICE USING THE SAME

(75) Inventor: Tatsumi Fujiyoshi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 262 days.

(21) Appl. No.: 09/611,435

(22) Filed: Jul. 6, 2000

(30) Foreign Application Priority Data

Jul. 7, 1999 (JP) .......................................... 11-193721

(51) Int. Cl.$^7$ .............................. G09G 5/02; G06K 9/32
(52) U.S. Cl. ...................... 345/698; 345/699; 382/298; 382/299; 382/300
(58) Field of Search .............................. 345/698, 600, 345/660, 699; 382/298–300

(56) References Cited

U.S. PATENT DOCUMENTS

| 5,170,442 A | * 12/1992 | Murai et al. ................. 382/301 |
| 5,757,982 A | * 5/1998 | Tepmongkol ............... 358/296 |
| 5,832,143 A | 11/1998 | Suga et al. |
| 6,002,813 A | * 12/1999 | Cho et al. .................... 348/458 |
| 6,151,025 A | * 11/2000 | Yen et al. ..................... 345/418 |
| 6,430,321 B1 | * 8/2002 | Choo ........................... 345/615 |

FOREIGN PATENT DOCUMENTS

JP        7-281637       10/1995

* cited by examiner

Primary Examiner—Matthew C. Bella
Assistant Examiner—Anthony J Blackman
(74) Attorney, Agent, or Firm—Brinks Hofer Gilson & Lione

(57) ABSTRACT

A pixel resolution converting circuit enlarges an image by vertically and horizontally doubling the pixel resolution without degrading image quality due to reduction in the density of displayed information. A 3-by-3 (nine) pixel array pattern of input image data, including a pixel to be converted and eight pixels vertically, horizontally, and diagonally surrounding the pixel to be converted, is compared with specific array patterns selected from all possible array patterns formed by combinations of the 3-by-3 (nine) pixel binary image data. As a result, it is determined whether the array pattern of the input image data matches the specific array patterns. If the input image data matches any one of the specific array patterns, image data differing from that of the pixel to be converted is applied to part of image data corresponding to four pixels obtained by vertically and horizontally doubling the pixel to be converted.

18 Claims, 8 Drawing Sheets

ONLY WHEN CENTRAL PIXEL IS IN EVEN COLUMN AND IN EVEN ROW (OR IN ODD COLUMN AND IN ODD ROW)

▨ MAY BE EITHER ☐ OR ▨

あいうえお かきくけこ
さしすせそ たちつてと

アイウエオ カキクケコ
サシスセソ タチツテト

拡大表示についての試験です。

あいうえお かきくけこ
さしすせそ たちつてと

アイウエオ カキクケコ
サシスセソ タチツテト

拡大表示についての試験です。

PIXEL RESOLUTION CONVERTING CIRCUIT AND IMAGE DISPLAY DEVICE USING THE SAME

BACKGROUND OF THE INVENTION

1. Field of the Invention

The present invention relates to pixel resolution converting circuits capable of extending the pixel resolution and to image display devices using the same.

2. Description of the Related Art

As display devices of personal computers and the like are enlarged and high definition display devices are developed, image display devices capable of converting resolution are becoming widely used. In such image display devices, a video graphics array (VGA) (640×480 dots) input signal is enlarged and displayed on a super extended graphics array (SXGA) (1280×1024 dots) display area using a general horizontal/vertical doubling method for horizontally and vertically doubling the size of the input signal. In this conversion method, data for one original pixel is applied unchanged to four pixels by horizontally and vertically doubling the original pixel.

FIG. 10 shows the conventional horizontal/vertical doubling conversion method. When data for four original pixels A, B, C, and D are horizontally and vertically doubled and converted into sixteen pixels, each data of the original pixels A, B, C, and D is applied unchanged to four-pixel data obtained by the horizontal/vertical doubling conversion. In practice, four pixels are regarded as one pixel, and display is performed in this way.

Development of display devices of personal computers and the like progressed by realizing large-screen, high-definition display devices. In other words, information to be displayed has been increased, whereas information per unit area in a display area has remained unchanged. When the conventional doubling conversion method is employed to enlarge and display data, information per unit area in the display area is reduced to half, and the density of information in the display area is thereby reduced. This generates jagged edges ("jaggies") when a character is displayed on such a display device. As a result, image quality is significantly degraded.

FIG. 11 shows an example of an image before the image is enlarged. FIG. 12 shows an example of the same image after the conventional doubling conversion is performed. Referring to FIG. 11, the jaggies in the contours of characters are relatively unnoticeable. However, in FIG. 12, the jagged contours in curved portions of the characters become noticeable. It can be concluded that image quality is degraded by reduction in the density of displayed information.

SUMMARY OF THE INVENTION

Accordingly, it is an object of the present invention to provide a pixel resolution converting circuit for horizontally and vertically doubling the pixel resolution and for preventing degradation of image quality due to reduction in the density of displayed information.

According to an aspect of the present invention, the foregoing objects are achieved through the provision of a pixel resolution converting circuit. The pixel resolution converting circuit includes a data array pattern comparing unit for binarizing an input video signal. The data array pattern comparing unit compares a 3-by-3 (nine) pixel array pattern of input image data, including a pixel to be converted and eight pixels vertically, horizontally, and diagonally surrounding the pixel to be converted, and a specific array pattern selected from all possible array patterns formed by combinations of 3-by-3 (nine) pixel binary image data. As a result, it is determined whether the array pattern of the input image data matches the specific array pattern. When the array pattern of the input image data matches the specific array pattern, an enlarged image data generating unit applies image data differing from that of the pixel to be converted to part of image data corresponding to four pixels obtained by vertically and horizontally doubling the pixel to be converted. When the array pattern of the input image data does not match the specific array pattern, the same image data as that of the pixel to be converted is applied to the image data corresponding to all four pixels.

With this arrangement, the image data information about the pixel to be converted and about the surrounding eight pixels is reflected in the image data of the four pixels obtained by enlargement of the pixel to be converted. Based on comparison between the pattern of the nine-pixel image data and the specific pattern, when it is determined that the image forms part of the contour in the diagonal direction, the image data differing from that of the pixel to be converted is applied to part of the image data of the four pixels. Accordingly, the jagged portions in the contour in the diagonal direction can be minimized, thus preventing image quality from being degraded by enlargement.

Preferably, the specific array pattern includes an array pattern in which the image data of the pixel to be converted differs from image data of two pixels adjacent to the pixel to be converted and diagonally adjacent to each other. In such a case, it is preferable that the enlarged image data generating unit differentiate, among the image data of the four pixels to be generated, only image data corresponding to a position adjacent to both pixels having the different image data from the image data of the pixel to be converted.

With this arrangement, when the array pattern of the input image data matches the specific array pattern, it is possible to conclude that the pixel to be converted forms, for example, part of the contour in the diagonal direction. Based on the matched specific array pattern, it is possible to specify the pixel, among the four pixels obtained by vertically and horizontally doubling the pixel to be converted, to which the image data differing from that of the pixel to be converted is to be applied. This minimizes the jagged portions in the contour in the diagonal direction, and thereby prevents image quality from being degraded by enlargement.

Among the image data of the eight pixels surrounding the pixel to be converted, the specific array pattern may include any one of an array pattern in which the number of pixels having the image data differing from that of the pixel to be converted is three, there being at least one pair of adjacent pixels having the different image data, an array pattern in which the number of pixels having the image data differing from that of the pixel to be converted is four, there being two or more pairs of adjacent pixels having the different image data, and an array pattern in which the number of pixels having the image data differing from that of the pixel to be converted is fives there being three or more pairs of adjacent pixels having the different image data. In such a case, it is preferable that the enlarged image data generating unit differentiate, among the image data of the four pixels to be generated, only image data corresponding to a position adjacent to the two pixels adjacent to the pixel to be converted, diagonally adjacent to each other and having the different image data from the image data of the pixel to be converted.

With this arrangement, when the pixel to be converted forms part of the contour in the diagonal direction, the image data differing from that of the pixel to be converted is not easily applied to part of the image data corresponding to the four pixels obtained by vertically and horizontally doubling the pixel to be converted. Hence, image quality is prevented from being degraded by enlargement.

When the specific array pattern is a pattern in which, among the image data of the eight pixels surrounding the pixel to be converted, the number of pixels having image data differing from that of the pixel to be converted is three, there being two pairs of adjacent pixels having the different image data, and when the position of the pixel to be converted is in an even column and an even row or in an odd column and an odd row, it is preferable that the enlarged image data generating unit differentiate, among the image data of the four pixels to be generated, only image data corresponding to a position adjacent to both sets of pixels having the different image data from the image data of the pixel to be converted.

With this arrangement, when the pixel to be converted forms part of the contour in the continuous diagonal direction, the image data differing from that of the pixel to be converted is not easily applied to part of the image data corresponding to the four pixels obtained by vertically and horizontally doubling the pixel to be converted. Hence, image quality is prevented from being degraded by enlargement.

According to another aspect of the present invention, there is provided an image display device including the above-described pixel resolution converting circuit. According to the image display device, it is possible to perform enlarged display in which a displayed image is vertically and horizontally doubled without degrading image quality.

DESCRIPTION OF THE PREFERRED EMBODIMENTS

Figure 1:
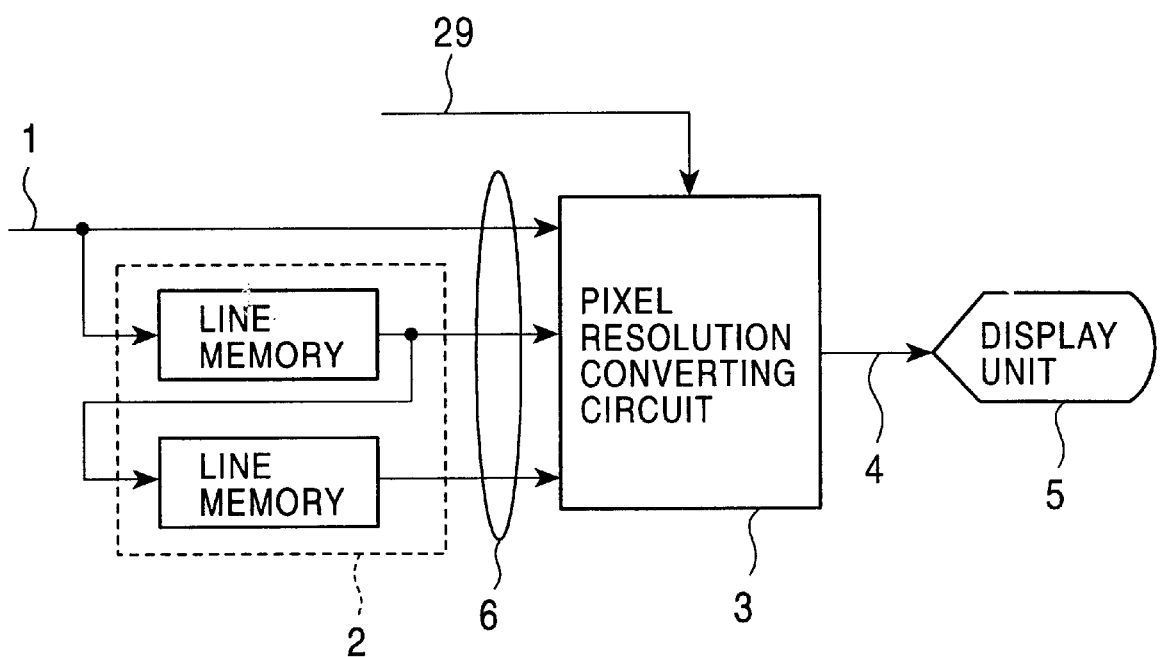
FIG. 1 is a block diagram of a pixel resolution converting circuit and surrounding portions according to an embodiment of the present invention.
Figure 2:
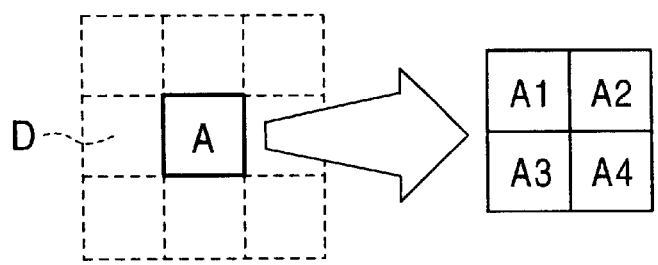
FIG. 2 is a conceptual diagram of enlargement processing of the present invention.

The present invention will be understood from the following description of the preferred embodiments taken in conjunction with the accompanying drawings. FIG. 1 shows an example of the structure of an image display device according to an embodiment of the present invention. Referring to FIG. 1, a pixel resolution converting circuit according to an embodiment of the present invention and surrounding portions for performing doubling enlargement processing are illustrated. FIG. 2 conceptually shows the enlargement processing of the present invention. Referring to FIG. 2, a target pixel A at the center of input image data D is converted into four pixels A1 to A4 by referring to the eight pixels surrounding pixel A.

Referring to FIG. 1, an input video signal 1 is delayed for one line by a line memory group 2 so that reference to the surrounding eight pixels can be made. A resultant video signal 6 for three lines is input to a pixel resolution converting circuit 3. The pixel resolution converting circuit 3 refers to data of the target pixel and to data of the surrounding eight pixels, and converts one-pixel data into four-pixel data. Then, the pixel resolution converting circuit 3 converts the four-pixel data into a signal 4 for each line. A display unit 5 performs enlarged display of the input data.

The conversion processing is described in detail. Subsequent to binarization of the data of the target pixel and the data of the surrounding eight pixels, the arrangement of the pixels is checked. The center of the dynamic range or the average of reference pixel data is employed as a threshold for performing binarization. Alternatively, the threshold can appropriately be changed in accordance with characteristics of the video signals. Hereinafter, the binarized pixel data is referred to as "0" or "1". These two binary patterns indicate black by "0" and white by "1". When the target pixel is 0 (black), the surrounding eight pixels can be in patterns shown in FIG. 4. Similarly, when the target pixel is 1 (white), possible data patterns of the surrounding eight pixels are shown in FIG. 5. Besides these patterns shown in FIGS. 4 and 5, possible patterns can be obtained by 90°, 180°, and 270° rotations. In this description, these rotated patterns are omitted. Among these binary patterns, most patterns are such that the data of the target pixel before conversion can be applied unchanged to all four pixels obtained by conversion. However, patterns encircled by dotted lines in FIGS. 4 and 5, and rotated patterns thereof obtained by 90°, 180°, and 270° rotations need to be treated differently in order to prevent degradation in image quality. This fact is verified by the inventor of the present invention. By converting these patterns in accordance with rules illustrated in FIGS. 6 and 7, it is possible to prevent image quality from being degraded when the target pixel in each pattern is enlarged.

Figure 4:
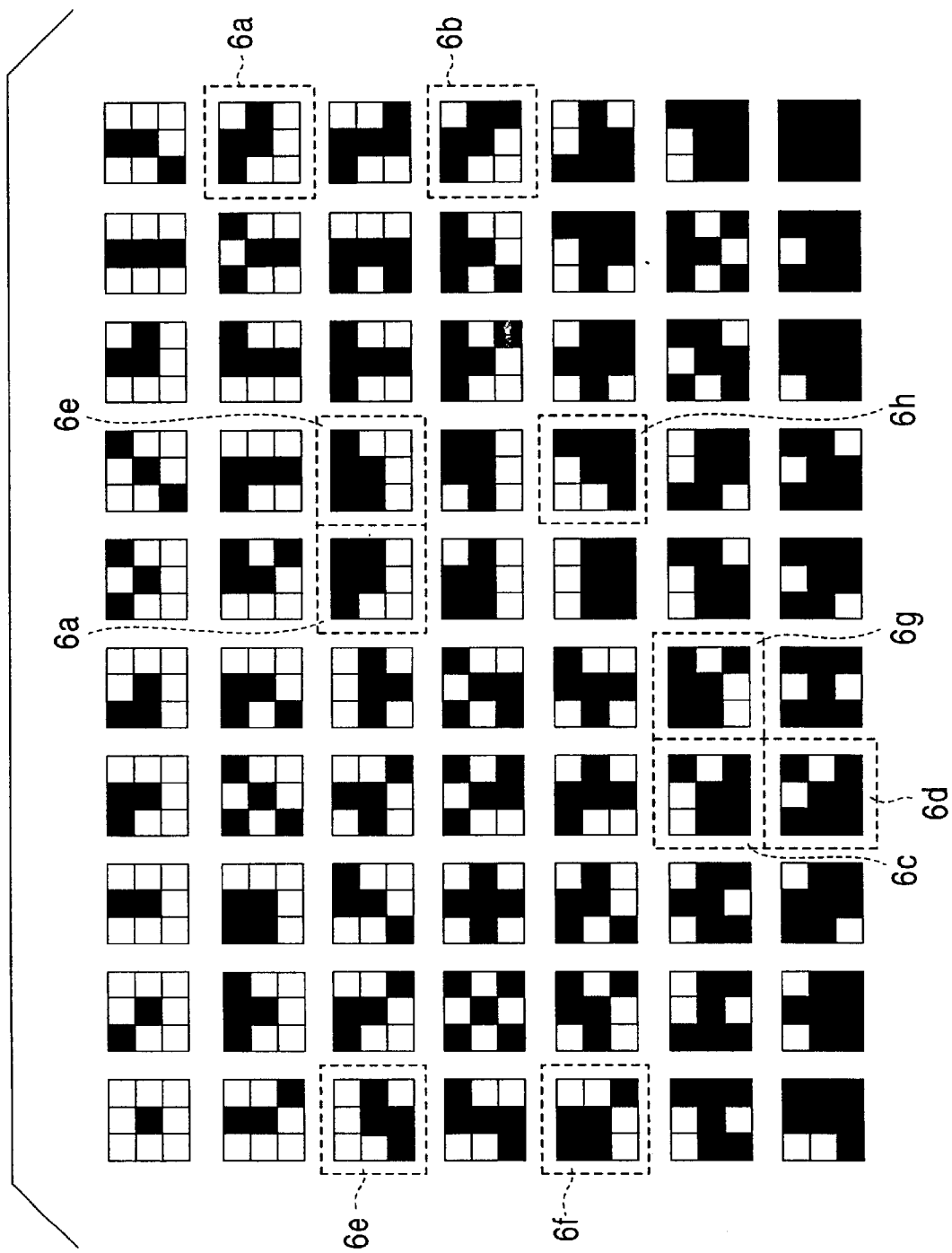
FIG. 4 is an illustration of patterns of eight pixels surrounding a pixel to be converted (hereinafter referred to as a "target pixel") at the center of input image data in which the target pixel is 0 (black)
Figure 5:
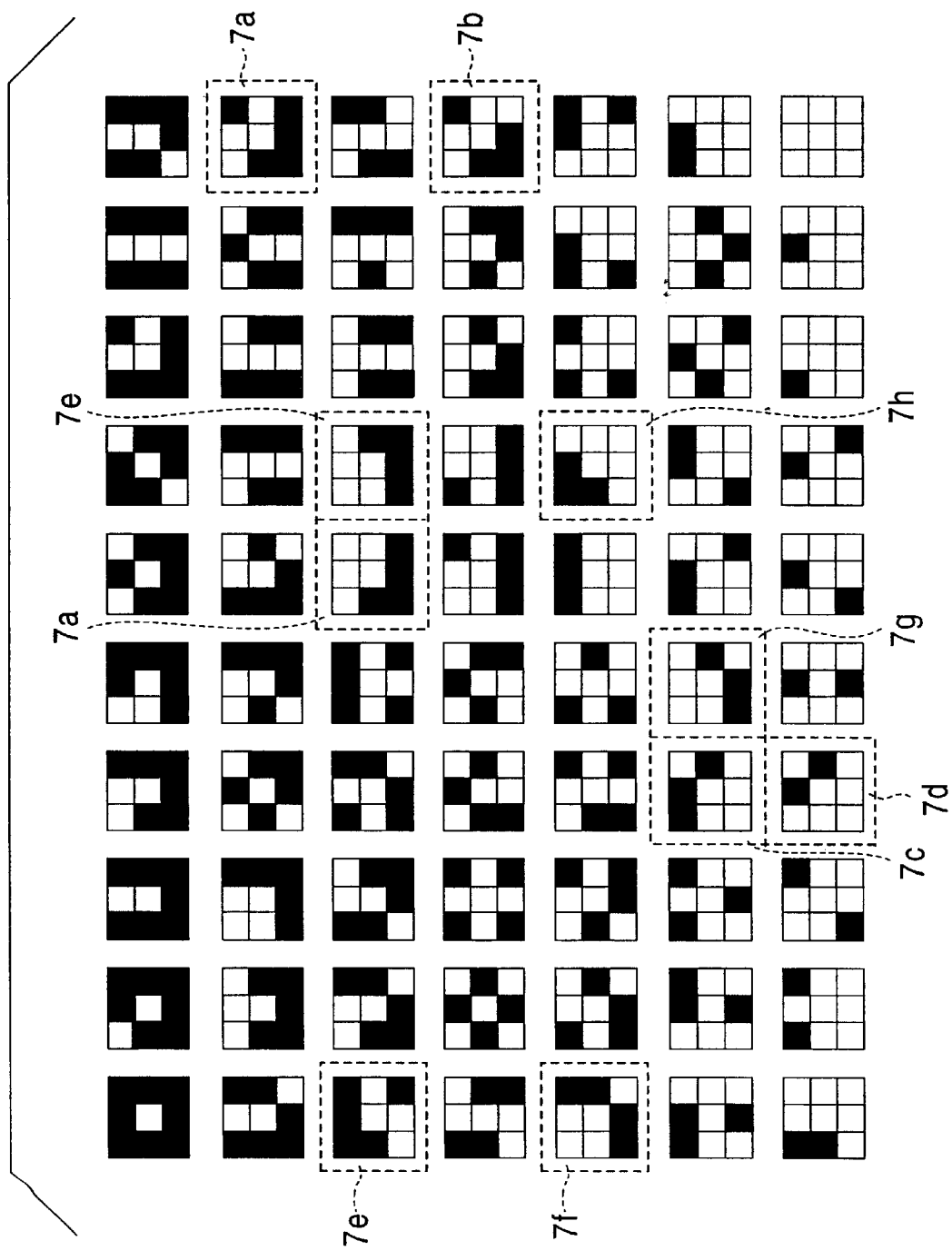
FIG. 5 is an illustration of patterns of eight pixels surrounding a target pixel at the center of input image data in which the target pixel is 1 (white)
Figure 6:
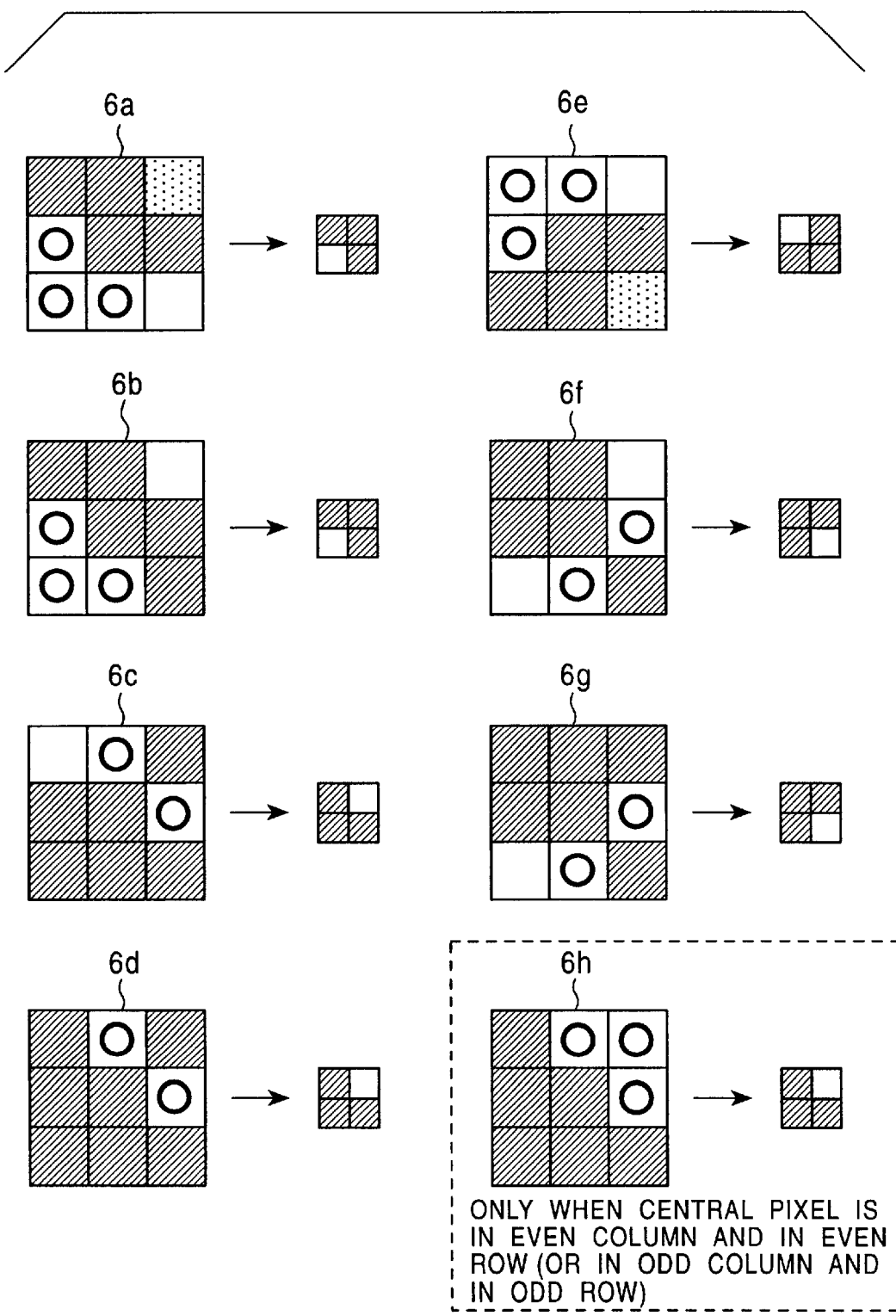
FIG. 6 is an illustration of pixel resolution conversion rules in the present invention when the target pixel is 0 (black)
Figure 7:
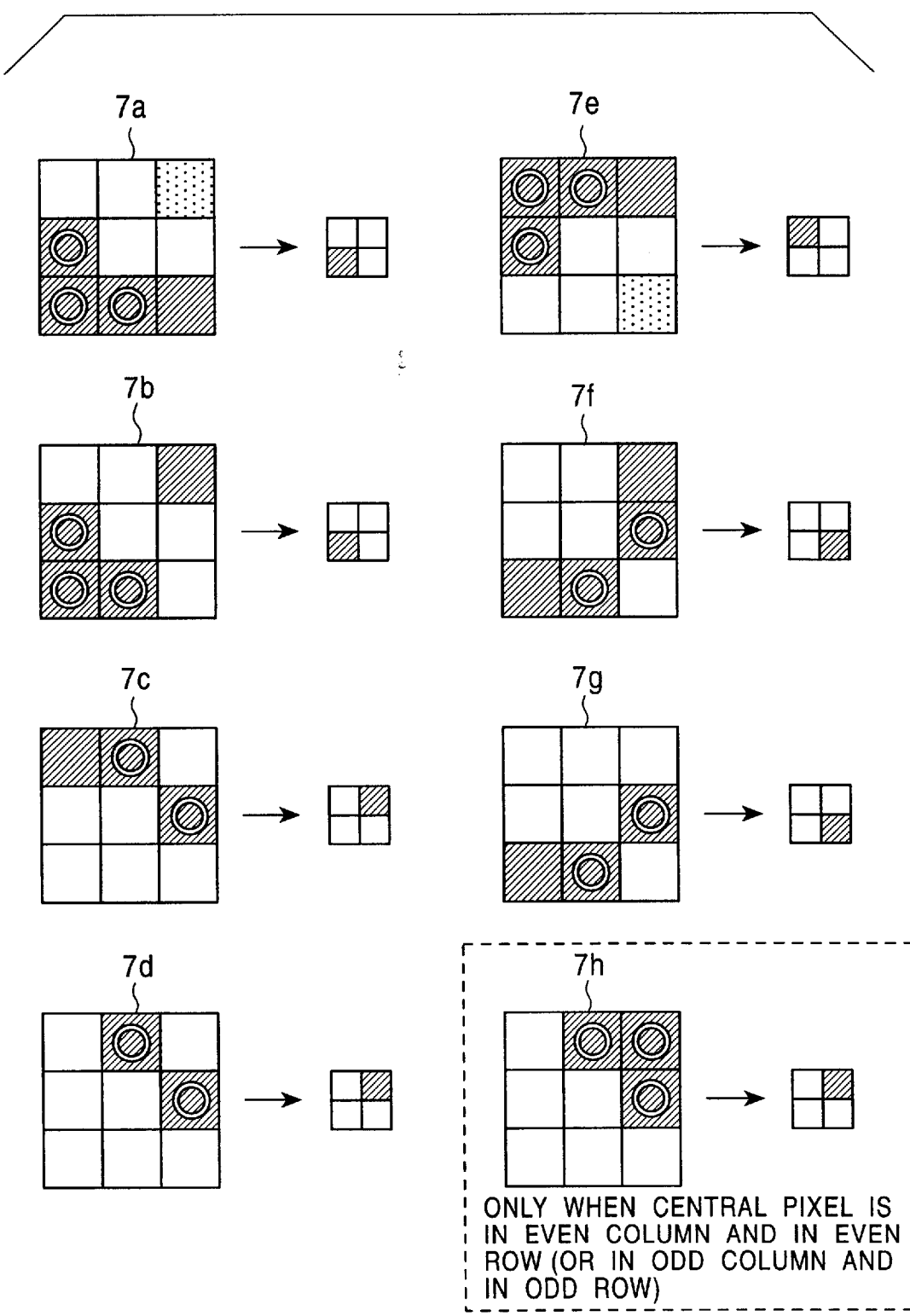
FIG. 7 is an illustration of pixel resolution conversion rules in the present invention when the target pixel is 1 (white)

FIGS. 6 and 7 show conversion rules corresponding to the patterns encircled by dotted lines in FIGS. 4 and 5, respectively. In each pattern of nine pixels including the target pixel and the surrounding eight pixels, the target pixel is converted into four pixels as indicated by an arrow. FIG. 6 shows cases when the target pixel is 0 (black). FIG. 7 shows cases when the target pixel is 1 (white). More specifically, pattern 6a shown in FIG. 6 is such that the target pixel is 0 (black). Four pixels obtained by conversion are such that a lower left pixel is 1 (white), and the remaining three pixels are 0 (black). In this conversion, the data of the target pixel prior to binarization is applied unchanged to the black pixels. To the white pixel, the average of the pixel data indicated by circles among the surrounding eight pixels is applied. Accordingly, similar conversion processing is performed for patterns 6b to 6h by referring to nine pixels in each pattern. In patterns 6a and 6e, shaded pixels may be either 0 (black) or 1 (white)

For example, pattern 6a in FIG. 6 indicates the following. The image data (0, black) of the target pixel differs from one of the pixels (1, white) on the same row (horizontal) as the target pixel, and differs from the pixels (1, white) in the row below the target pixel on the same column (vertical), to the right and the left of the target pixel. Among image data of four generated pixels, only image data corresponding to the position adjacent to the pixels (left-hand side and lower center) whose image data differ from that of the target pixel is made different (1, white) from the image data of the target pixel. In pattern 6a in FIG. 6, when the shaded pixel is 0 (black), there are three pairs (left-hand side and lower left, lower left and lower center, and lower center and lower right) of adjacent pixels that have the same image data (1, white) that is different from the image data (0, black) of the target pixel. Among the image data of the four generated pixels, only the image data corresponding to the position (lower left) adjacent to the pixels (left-hand side and lower center) whose image data differ from the target pixel is made different (1, white) from the image data of the target pixel. The above "pairs of adjacent pixels" only include those which are adjacent (vertically, horizontally or diagonally) and have at least one pixel on the same row or column as the target pixel, the pairs of adjacent pixels both having image data different from the target pixel.

Alternatively, in all of the array patterns to be matched, 6a–6f, image data of the target pixel differs from image data of two pixels adjacent to the target pixel and diagonally adjacent to each other.

In FIG. 7, the values 0 (black) and 1 (white) in FIG. 6 are inverted. In this case, the same processing is performed as in FIG. 6. Among four pixels obtained by conversion, data of the target pixel before binarization is applied unchanged to pixels having 1 (white). To pixels having 0 (black), the average of pixel data indicated by circles among the eight surrounding pixels before binarization is applied. For 90°, 180°, and 270° rotated patterns of the patterns shown in FIGS. 6 and 7, similar processing is performed.

Figures 8, 9:
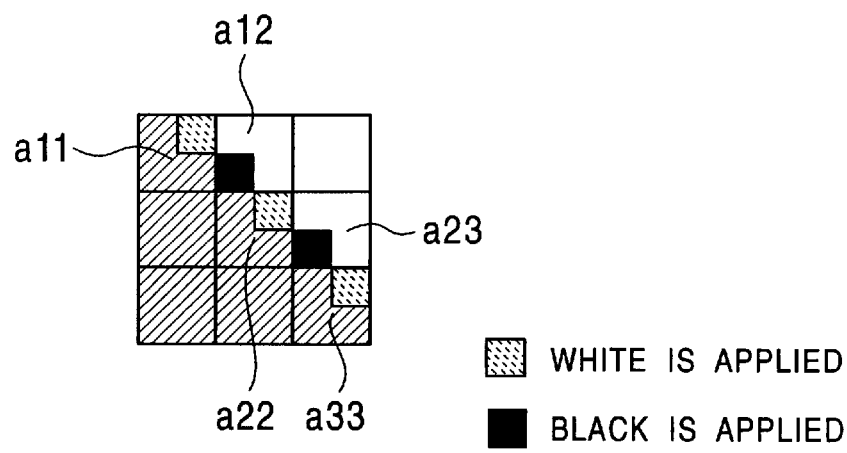
FIG. 8 is an illustration of a problem in an example of an image in the present invention.
FIG. 9 is an illustration of an example of an image obtained by doubling enlargement in the present invention.

A particular consideration must be given to pattern 6h in FIG. 6 and to pattern 7h in FIG. 7 (encircled by dotted lines) when converting the target pixel. For example, when displaying a figure, and when the border between 0 (black) and 1 (white) is continuous in the 45° direction due to the pixel arrangement, pattern 6h and pattern 7h are alternately converted. As a result, a pattern shown in FIG. 8 is obtained. If pattern 6h in FIG. 6 and pattern 7h in FIG. 7 are converted in the same manner despite the position of the target pixel, the following problem occurs: When the target pixel is 0 (black) as in pattern 6h in FIG. 6, four pixels obtained by conversion are such that the upper right pixel becomes 1 (white). In addition, a 180° rotated pattern of pattern 7h in FIG. 7, the target pixel is 1 (white), and, among four pixels obtained by conversion, the lower left pixel becomes 0 (black). In this case, the result of conversion is such as that shown in FIG. 8. For groups a11, a22, and a33 of four pixels, 1 (white) is applied to each upper right pixel. For groups a12 and a23 of four pixels, 0 (black) is applied to each lower left pixel. When this pattern in FIG. 8 is compared with pattern 6h in FIG. 6, valley portions of the jaggies before conversion become ridge portions of the jaggies after conversion, and ridge portions before conversion become valley portions after conversion. In other words, the size of the valleys and the ridges remains the same, failing to prevent image quality from being degraded.

In order to minimize this problem, pattern 6h in FIG. 6 and pattern 7h in FIG. 7 are converted only when each target pixel is in an even column and in an even row, or in an odd column and in an odd row. With continued reference to FIG. 8, the groups a11, a22, and a33 of four pixels, each disposed in an even column and in an even row, or in an odd column and in an odd row, are converted such that 1 (white) is applied to each upper right pixel. In contrast, for the groups a12 and a23 which are not in an even column and in an even row, or in an odd column and in an odd row, each lower left pixel is not converted to 0 (black). All four pixels in each of the groups a12 and a23 become 1 (white). As a result, pixels to which black is applied in FIG. 8 become white, thus minimizing the jaggies compared to uniformly converting pattern 6h in FIG. 6 and pattern 7h in FIG. 7. It is therefore possible to prevent image quality from being degraded.

Figures 10, 11, 12:
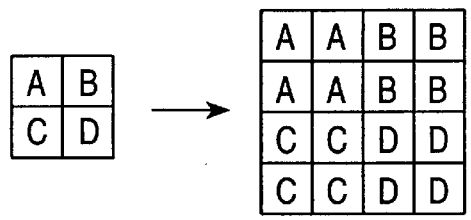
FIG. 10 is an illustration of a conventional doubling enlargement method.
FIG. 11 is an illustration of an example of an image before the image is enlarged.
FIG. 12 is an illustration of an example of an image obtained by the conventional doubling enlargement.

FIG. 9 shows an example of an image obtained by performing doubling enlargement by the present invention of the image shown in FIG. 11. In comparison with the image shown in FIG. 12, the image shown in FIG. 9 is enlarged and displayed without being degraded in image quality by reduction in information.

Figure 3:
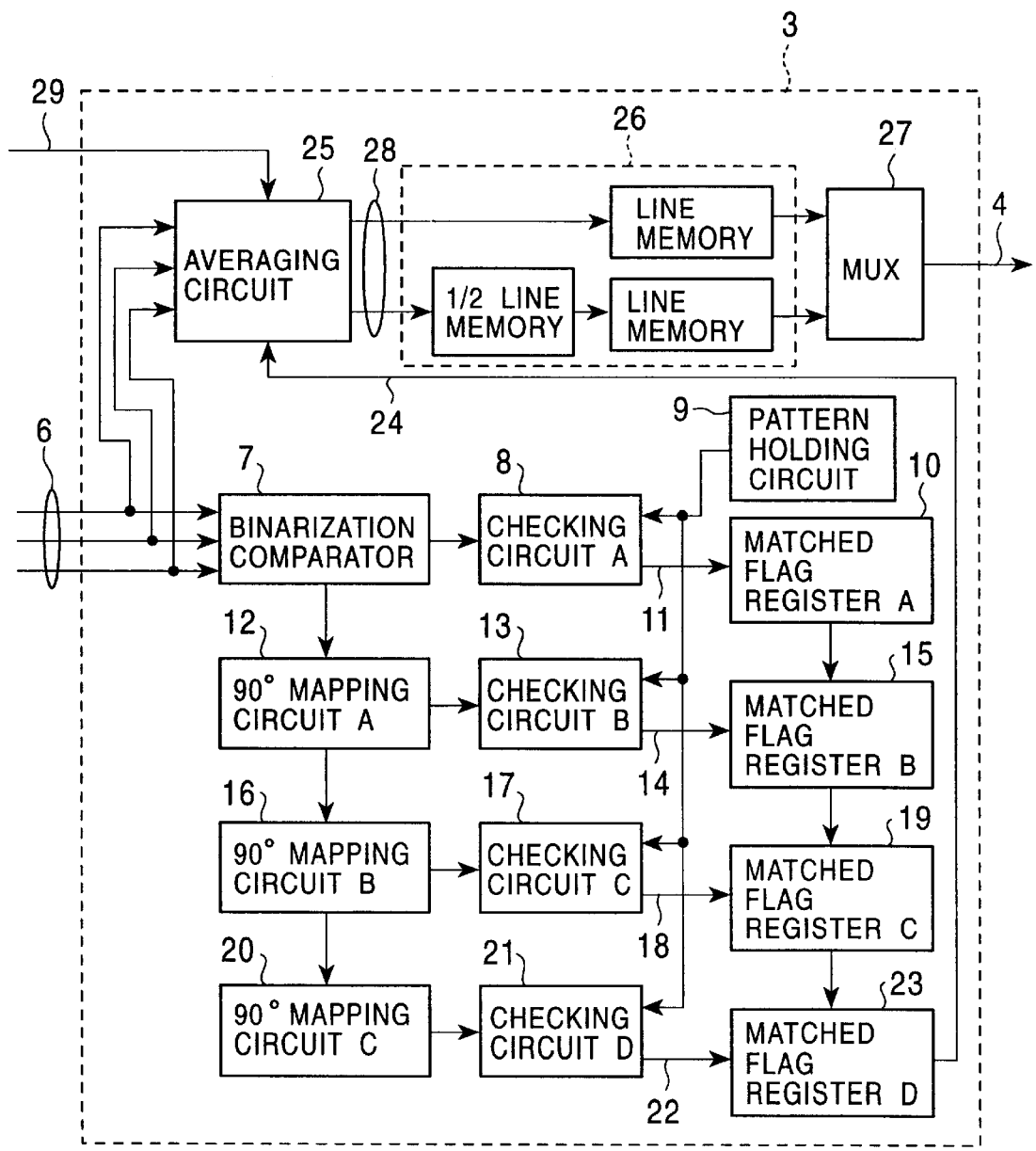
FIG. 3 is a block diagram of the pixel resolution converting circuit shown in FIG. 1.

Next, a specific example of a circuit for performing the above conversion processing is described. Referring to FIG. 3, the pixel resolution converting circuit 3 of the embodiment is illustrated. It is assumed that the processing is performed by a digital circuit. In FIG. 3, a clock signal and the like are omitted in order to avoid complexity. The video signal 6 for three lines is input to a binarization comparator 7 and to an averaging circuit 25. The binarization comparator 7 sequentially binarizes the input video signal 6. Subsequently, the binarization comparator 7 holds binary data (0, 1) of a target pixel and surrounding eight pixels, and outputs the data to a checking circuit A 8.

In contrast, a pattern holding circuit 9 holds binary patterns of 3-by-3 nine pixels, corresponding to those shown in FIG. 6, in the form of 0 and 1 values. The pattern holding circuit 9 is formed by a ROM or a RAM. The pattern holding circuit 9 outputs data corresponding to each pattern to the checking circuit A 8. The checking circuit A 8 checks correspondence between the pixel data output from the binarization comparator 7 and the data output from the pattern holding circuit 9. The checking circuit A 8 outputs a matching detection signal 11 to a matched flag register A 10 only when all nine pixels in each pattern in FIG. 6 are matched or unmatched. Detecting the pattern in which all nine pixels are unmatched is equivalent to performing matching detection for patterns in FIG. 7 in which black and white are inverted. The matching detection signal 11 includes information for discriminating a matched pattern from eight patterns in FIG. 6, and rotation information about the matched pattern. This rotation information is employed to discriminate a pattern as one of 0°, 90°, 180°, and 270° rotations of each pattern.

The pattern output from the binarization comparator 7 to the checking circuit A 8 corresponds to the positional information of the video signal 6 for three lines. The rotation information indicates that the pattern is rotated 0°. The initial state of the matched flag register A 10 is set to a state in which matching is not detected. The matched flag register A 10 holds matching detection information only when such information is included in the matching detection signal 11 transmitted from the checking circuit A 8.

Next, the binarization comparator 7 transmits binary data of the target pixel and surrounding eight pixels to a 90° mapping circuit A 12. The 90° mapping circuit A 12 holds binary data of nine pixels in such a pattern that the surrounding eight pixels are rotated 90° around the central target pixel. The 90° mapping circuit A 12 outputs the binary data to a checking circuit B 13. Since the pattern holding circuit 9 outputs to the checking circuit B 13 the same data as that output to the checking circuit A 8, the checking circuit B 13 performs detection processing similar to that performed by the checking circuit A 8. When matching is detected by the checking circuit B 13, a matching detection signal 14 includes information for discriminating a matched pattern and rotation information about the pattern which indicates that the pattern is rotated 90°. A matched flag register B 15 holds the matching detection signal 14.

Accordingly, the 90° mapping circuit A 12, a 90° mapping circuit B 16, and a 90° mapping circuit C 20 perform matching detection of 90°, 180°, and 270° rotated patterns of the patterns shown in FIG. 6. The matched flag register A 10, the matched flag register B 15, a matched flag register C 19, and a matched flag register D 23 include components constructed by shift registers. These matched flag registers 10, 15, 19, and 23 sequentially hold matching detection information for each of 0°, 90°, 180°, and 270° rotations of the patterns in FIG. 6. When matching is not detected in 0°, 90°, 180°, and 270° rotated patterns of the patterns in FIG. 6, the matched flag register D 23 outputs the initial state of the matched flag register A 10 as an output 24.

The matching detection processing is performed by pipeline processing for each rotation of the patterns. Alternatively, if it is possible, the matching detection processing can be performed in batch processing.

The averaging circuit 25 performs conversion processing shown in FIGS. 6 and 7 based on the video signal 6 for three lines and the output 24 from the matched flag register D 23. The conversion processing is performed by determining, among four pixels obtained by conversion, pixels to which the data of the target pixel is to be applied unchanged, and pixels to which the average of pixels indicated by circles is to be applied. As a result, data of the four converted pixels are obtained. The conversion processing is performed by an arithmetic logical circuit. When pattern 6*h* in FIG. 6 and pattern 7*h* in FIG. 7 are converted, a synchronization signal 29 and a clock are counted, thus determining the position of the pixel, that is, determining whether the pixel is in an even column and in an even row, etc. The conversion processing is thereby performed.

The averaging circuit 25 outputs data 28 of the four converted pixels. Since the data 28 is pixel data for two lines, it is necessary to take into consideration an interface with a general video signal. Hence, a line memory group 26 and a multiplexer (MUX) 27 are employed to convert the data 28 into one-line sequential image data, and output a signal 4 for each line.

What is claimed is:

1. A pixel resolution converting circuit to double and output a horizontal pixel resolution and a vertical pixel resolution of an input image signal to be displayed on a display, said pixel resolution converting circuit comprising:

a data array pattern comparer to binarize the input image signal, to compare a 3-by-3 (nine) pixel array pattern of input image data, including a pixel to be converted and eight pixels vertically, horizontally, and diagonally surrounding the pixel to be converted, and a specific array pattern selected from all possible array patterns formed by combinations of 3-by-3 (nine) pixel binary image data, and to determine whether the array pattern of the input image data matches the specific array pattern; and an enlarged image data generator to apply, when the array pattern of the input image data matches the specific array pattern, image data differing from that of the pixel to be converted to part of image data corresponding to four pixels obtained by vertically and horizontally doubling the pixel to be converted, and, when the array pattern of the input image data does not match the specific array pattern, to apply the same image data as that of the pixel to be converted to the image data corresponding to all four pixels, pixels to be converted having the same array pattern producing different image data corresponding to the four pixels depending on a location of the pixel to be converted in the display, wherein the data array pattern comparer includes: a binarization comparator that binarizes the array pattern of the input image signal, three mapping circuits that rotate the array pattern by 90°, 180°, and 270°, respectively, four checking circuits, each of which compares the specific array pattern with the array pattern of the input image data at a different rotation angle from a different mapping circuit and determines one of whether all of the pixels in the array pattern match the specific array pattern and whether all of the pixels in the array pattern are unmatched with the specific array pattern, and an averaging circuit that receives the array pattern and data that indicates a match has been made between the array pattern and the specific array pattern as well as the rotation angle in which the match was achieved.

2. A pixel resolution converting circuit according to claim 1, wherein, when the specific array pattern includes an array pattern in which the image data of the pixel to be converted differs from image data of two pixels adjacent to the pixel to be converted and diagonally adjacent to each other, said enlarged image data generator differentiates, among the image data of the four pixels to be generated, only image data corresponding to a position adjacent to the two pixels having the different image data from the image data of the pixel to be converted.

3. A pixel resolution converting circuit according to claim 2, wherein, among the image data of the eight pixels surrounding the pixel to be converted, when the specific array pattern includes any one of:

an array pattern in which the number of pixels having the image data differing from that of the pixel to be converted is three, there being at least one pair of adjacent pixels having the different image data, an array pattern in which the number of pixels having the image data differing from that of the pixel to be converted is four, there being two pairs of adjacent pixels having the different image data, and an array pattern in which the number of pixels having the image data differing from that of the pixel to be converted is five, there being three pairs of adjacent pixels having the different image data, said enlarged image data generating mechanism differentiates, among the image data of the four pixels to be generated, only image data corresponding to a position adjacent to the two pixels diagonally adjacent to each other and having the different image data from the image data of the pixel to be converted.

4. A pixel resolution converting circuit according to claim 3, wherein, when the specific array pattern is a pattern in which, among the image data of the eight pixels surrounding the pixel to be converted, three pixels having image data differing from that of the pixel to be converted are all adjacent to each other, and only when the position of the pixel to be converted is in one of an even column and an even row of the display and in an odd column and an odd row of the display, said enlarged image data generator differentiates, among the image data of the four pixels to be generated, only image data corresponding to a position adjacent to both pairs of pixels having the different image data from the image data of the pixel to be converted.

5. An image display device comprising a pixel resolution converting circuit as set forth in claim 1.

6. An image display device according to claim 5, wherein, in said pixel resolution converting circuit, when the specific array pattern includes an array pattern in which the image data of the pixel to be converted differs from image data of two pixels adjacent to the pixel to be converted the pixel to be converted and diagonally adjacent to each other, said enlarged image data generator differentiates, among the image data of the four pixels to be generated, only image data corresponding to a position adjacent to the two pixels diagonally adjacent to each other and having the different image data from the image data of the pixel to be converted.

7. An image display device according to claim 6, wherein, in said pixel resolution converting circuit, among the image data of the eight pixels surrounding the pixel to be converted, when the specific array pattern includes any one of:

an array pattern in which the number of pixels having the image data differing from that of the pixel to be converted is three, there being at least one pair of adjacent pixels having the different image data, an array pattern in which the number of pixels having the image data differing from that of the pixel to be converted is four, there being two pairs of adjacent pixels having the different image data, and an array pattern in which the number of pixels having the image data differing from that of the pixel to be converted is five, there being three pairs of adjacent pixels having the different image data, said enlarged image data generator differentiates, among the image data of the four pixels to be generated, only image data corresponding to a position adjacent to the two pixels diagonally adjacent to each other and having the different image data from the image data of the pixel to be converted.

8. An image display device according to claim 7, wherein, in said pixel resolution converting circuit, when the specific array pattern is a pattern in which, among the image data of the eight pixels surrounding the pixel to be converted, three pixels having image data differing from that of the pixel to be converted are all adjacent to each other, and only when the position of the pixel to be converted is in one of an even column and an even row of the display and in an odd column and an odd row of the display, said enlarged image data generator differentiates, among the image data of the four pixels to be generated, only image data corresponding to a position adjacent to both pairs of pixels having the different image data from the image data of the pixel to be converted.

9. A method of doubling a horizontal pixel resolution and a vertical pixel resolution of an input image signal to be displayed on a display, said method comprising:

binarizing the input image signal, comparing a 3-by-3 (nine) pixel array pattern of input image data, including a pixel to be converted and eight pixels vertically, horizontally, and diagonally surrounding the pixel to be converted, with a specific array pattern selected from all possible array patterns formed by combinations of 3-by-3 (nine) pixel binary image data;

determining whether the array pattern of the input image data matches the specific array pattern, the determining including: rotating the array patterns by 0°, 90°, 180°, and 270°, detecting after each rotation one of whether all of the pixels in the array pattern match the specific array pattern and whether all of the pixels in the array pattern are unmatched with the specific array pattern, and if after any rotation one of all of the pixels in the array pattern match the specific array pattern and all of the pixels in the array pattern are unmatched with the specific array pattern, supplying data that indicates a match has been made between the array pattern and the specific array pattern and that indicates a rotation angle of the array pattern that achieved the match between the array pattern and the specific array pattern; and applying, when the array pattern of the input image data matches the specific array pattern, image data differing from that of the pixel to be converted to part of image data corresponding to four pixels obtained by vertically and horizontally doubling the pixel to be converted, and, when the array pattern of the input image data does not match the specific array pattern, applying the same image data as that of the pixel to be converted to the image date corresponding to all four pixels, pixels to be converted having the same array pattern producing different image data corresponding to the four pixels depending on a location of the pixel to be converted in the display.

10. The method according to claim 9, further comprising, when the specific array pattern includes an array pattern in which the image data of the pixel to be converted differs from image data of two pixels adjacent to the pixel to be converted and diagonally adjacent to each other, differentiating, among the image data of the four pixels to be generated, only image data corresponding to a position adjacent to the two pixels having the different image data from the image data of the pixel to be converted.

11. The method according to claim 10, wherein the specific array pattern includes any one of:

an array pattern in which the number of pixels having the image data differing from that of the pixel to be converted is three, there being at least one pair of adjacent pixels having the different image data, an array pattern in which the number of pixels having the image data differing from that of the pixel to be converted is four, there being two pairs of adjacent pixels having the different image data, and an array pattern in which the number of pixels having the image data differing from that of the pixel to be converted is five, there being three pairs of adjacent pixels having the different image data.

12. The method according to claim 11, the differentiating further comprising, when the specific array pattern is a pattern in which, among the image data of the eight pixels surrounding the pixel to be converted, three pixels having image data differing from that of the pixel to be converted are all adjacent to each other, and only when the position of the pixel to be converted is in one of an even column and an even row of the display and in an odd column and an odd row of the display, differentiating, among the image data of the four pixels to be generated, only image data corresponding to a position adjacent to both pairs of pixels having the different image data from the image data of the pixel to be converted.

13. The pixel resolution converting circuit according to claim 1, wherein the enlarged image data generator converts the pixel to be converted of only one array pattern differently depending on the location of the pixel to be converted in the display, the one array pattern having, among the image data of the eight pixels surrounding the pixel to be converted, three pixels with image data different from that of the pixel to be converted and which are all adjacent to each other.

14. The pixel resolution converting circuit according to claim 13, wherein the enlarged image data generator sets, among the image data of the four pixels to be generated, only image data corresponding to a position adjacent to the three pixels to be different than the pixel to be converted only when the position of the pixel to be converted is in one of an even column and an even row of the display and in an odd column and an odd row of the display, and otherwise setting the image data corresponding to the position adjacent to the three pixels to be the same as the pixel to be converted.

15. The pixel resolution converting circuit according to claim 5, wherein the enlarged image data generator converts the pixel to be converted of only one array pattern differently depending on the location of the pixel to be converted in the display, the one array pattern having, among the image data of the eight pixels surrounding the pixel to be converted, three pixels with image data different from that of the pixel to be converted and which are all adjacent to each other.

16. The pixel resolution converting circuit according to claim 15, wherein the enlarged image data generator sets, among the image data of the four pixels to be generated, only image data corresponding to a position adjacent to the three pixels to be different than the pixel to be converted only when the position of the pixel to be converted is in one of an even column and an even row of the display and in an odd column and an odd row of the display, and otherwise setting the image data corresponding to the position adjacent to the three pixels to be the same as the pixel to be converted.

17. The method according to claim 9, further comprising converting the pixel to be converted of only one array pattern differently depending on the location of the pixel to be converted in the display, the one array pattern having, among the image data of the eight pixels surrounding the pixel to be converted, three pixels with image data different from that of the pixel to be converted and which are all adjacent to each other.

18. The method according to claim 13, further comprising setting, among the image data of the four pixels to be generated, only image data corresponding to a position adjacent to the three pixels to be different than the pixel, to be converted only when the position of the pixel to be converted is in one of an even column and an even row of the display and in an odd column and an odd row of the display, and otherwise setting the image data corresponding to the position adjacent to the three pixels to be the same as the pixel to be converted.

* * * * *

UNITED STATES PATENT AND TRADEMARK OFFICE
CERTIFICATE OF CORRECTION

PATENT NO. : 6,624,825 B1
DATED : September 23, 2003
INVENTOR(S) : Tatsumi Fujiyoshi It is certified that error appears in the above-identified patent and that said Letters Patent is hereby corrected as shown below:

Column 12,
Line 24, immediately after "than the pixel" delete "," (comma).

Signed and Sealed this

Thirteenth Day of January, 2004

JON W. DUDAS
*Acting Director of the United States Patent and Trademark Office*